(12) United States Patent
Claman et al.

(10) Patent No.: US 9,641,638 B2
(45) Date of Patent: May 2, 2017

(54) APPLICATION-GUIDED BANDWIDTH-MANAGED CACHING

(71) Applicant: Avid Technology, Inc., Burlington, MA (US)

(72) Inventors: Timothy H. Claman, Andover, MA (US); Himanshu S. Sinha, Acton, MA (US)

(73) Assignee: Avid Technology, Inc., Burlington, MA (US)

( * ) Notice: Subject to any disclaimer, the term of this patent is extended or adjusted under 35 U.S.C. 154(b) by 352 days.

(21) Appl. No.: 14/292,986

(22) Filed: Jun. 2, 2014

(65) Prior Publication Data

US 2014/0289472 A1 Sep. 25, 2014

Related U.S. Application Data

(63) Continuation of application No. 13/250,645, filed on Sep. 30, 2011, now Pat. No. 8,745,158.

(51) Int. Cl.
*H04L 29/08* (2006.01)
*H04L 29/06* (2006.01)
(Continued)

(52) U.S. Cl.
CPC ...... *H04L 67/2842* (2013.01); *G06F 12/0868* (2013.01); *G06F 17/30132* (2013.01);
(Continued)

(58) Field of Classification Search
CPC . H04L 67/28; H04L 67/2842; H04L 67/2852; H04L 67/2847; H04L 67/2814;
(Continued)

(56) References Cited

U.S. PATENT DOCUMENTS

| 5,812,791 A | 9/1998 | Wasserman et al. |
| 5,991,306 A * | 11/1999 | Burns ................. H04L 67/2847 370/429 |

(Continued)

FOREIGN PATENT DOCUMENTS

WO WO 9608772 3/1996

OTHER PUBLICATIONS

Almeida, Jussara M., et al., "A Hybrid Caching Strategy for Streaming Media Files", ACM Transactions on Computer Systems, vol. 14, No. 4, Nov. 1996, pp. 311-343.

(Continued)

*Primary Examiner* — Ramy M Osman
(74) *Attorney, Agent, or Firm* — Oliver Strimpel

(57) ABSTRACT

Methods and systems for populating a cache memory that services a media composition system. Caching priorities are based on a state of the media composition system, such as media currently within a media composition timeline, a composition playback location, media playback history, and temporal location within clips that are included in the composition. Caching may also be informed by descriptive metadata and media search results within a media composition client or a within a media asset management system accessed by the client. Additional caching priorities may be based on a project workflow phase or a client project schedule. Media may be partially written to or read from cache in order to meet media request deadlines. Caches may be local to a media composition system or remote, and may be fixed or portable.

20 Claims, 2 Drawing Sheets

(51) Int. Cl.
*G06F 17/30* (2006.01)
*G06F 12/0868* (2016.01)

(52) U.S. Cl.
CPC .... *H04L 29/08801* (2013.01); *H04L 65/4084* (2013.01); *H04L 65/60* (2013.01); *H04L 67/28* (2013.01); *H04L 67/2847* (2013.01); *H04L 67/2852* (2013.01)

(58) Field of Classification Search
CPC . H04L 65/60; H04L 65/4084; G06F 12/0868; G06F 12/0871
See application file for complete search history.

(56) References Cited

U.S. PATENT DOCUMENTS

| | | | |
|---|---|---|---|
| 6,092,154 A | 7/2000 | Curtis et al. | |
| 6,138,163 A * | 10/2000 | Nam | H04L 65/605 348/E5.008 |
| 6,400,768 B1 | 6/2002 | Nagumo et al. | |
| 7,133,600 B1 * | 11/2006 | Boyle | G11B 20/18 360/49 |
| 7,509,465 B1 * | 3/2009 | Misra | G06F 3/061 370/233 |
| 7,779,142 B1 * | 8/2010 | Greene | H04L 12/2801 370/235 |
| 7,802,006 B2 * | 9/2010 | Bowra | H04N 21/23406 709/231 |
| 8,037,241 B2 | 10/2011 | Rosker et al. | |
| 8,041,748 B2 * | 10/2011 | Taneja | G06F 17/30902 707/803 |
| 8,218,439 B2 * | 7/2012 | Deshpande | H04L 65/608 370/230.1 |
| 8,320,400 B1 * | 11/2012 | Lo | H04L 12/413 370/359 |
| 8,725,947 B2 * | 5/2014 | Sood | H04N 21/4331 709/219 |
| 8,745,158 B2 | 6/2014 | Claman et al. | |
| 8,904,458 B2 * | 12/2014 | Kortum | H04N 21/25891 725/142 |
| 8,997,160 B2 * | 3/2015 | Hunt | H04N 21/23439 709/231 |
| 9,104,582 B1 * | 8/2015 | Mukundan | H04L 67/2842 |
| 9,274,954 B1 * | 3/2016 | Bairavasundaram | G06F 12/0806 |
| 2002/0081094 A1 | 6/2002 | Hatabu | |
| 2003/0174769 A1 * | 9/2003 | Nagumo | H04N 19/105 375/240.02 |
| 2004/0003097 A1 | 1/2004 | Willis et al. | |
| 2004/0128343 A1 * | 7/2004 | Mayer | H04L 67/2847 709/203 |
| 2006/0026663 A1 * | 2/2006 | Kortum | H04N 7/17318 725/134 |
| 2008/0151817 A1 * | 6/2008 | Fitchett | H04W 28/20 370/329 |
| 2009/0055471 A1 * | 2/2009 | Kozat | H04L 65/4084 709/203 |
| 2009/0300320 A1 | 12/2009 | Zhang | |
| 2010/0242048 A1 | 9/2010 | Farney et al. | |
| 2011/0070854 A1 * | 3/2011 | Chen | G06F 5/06 455/208 |
| 2012/0047202 A1 * | 2/2012 | Van Ackere | H04L 67/108 709/203 |
| 2012/0047548 A1 | 2/2012 | Rowlands et al. | |
| 2012/0147865 A1 * | 6/2012 | Pothula | G01C 21/3461 370/338 |
| 2012/0331167 A1 * | 12/2012 | Hunt | G06F 21/10 709/231 |
| 2013/0042288 A1 * | 2/2013 | Fondberg | H04N 21/23106 725/109 |
| 2013/0182190 A1 * | 7/2013 | McCartney | H04B 3/54 348/730 |

OTHER PUBLICATIONS

Cao, Pei, et al., "Implementation and Performance of Integrated Application-Controlled File Caching, Prefetching, and Disk Scheduling", ACM Transactions on Computer Systems, vol. 14, No. 6, Nov. 1996, pp. 311-343.

Taeseok, Kim et al., "Considering User Behavior and Multiple QoS Supports in Multimedia Streaming Caching", The Journal of VLSI Signal Processing, vol. 46, No. 2-3, 2007, pp. 113-122.

Tewari, Renu, et al., "Caching in Bandwidth and Space Constrained Hierarchical Hyper-media Servers", Dept. of Computer Science, University of Texas at Austin, 1996, pp. 1-18.

Yadgar, Gala, et al., "Management of Multilevel, Multiclient Cache Hierarchies with Application Hints", ACM Transactions on Computer Systems, vol. 29, No. 2, Article 5, May, 2011, pp. 5.1-5.51.

* cited by examiner

APPLICATION-GUIDED BANDWIDTH-MANAGED CACHING

CROSS REFERENCE TO RELATED APPLICATIONS

This application claims priority to and the benefit of, under 35 U.S.C. §120, and is a continuing application of pending U.S. application Ser. No. 13/250,645, filed Sep. 30, 2011, which is incorporated herein by reference.

BACKGROUND

Bandwidth requirements for retrieval and playback of video in a shared storage environment have increased with the shift from standard definition to high definition video, and to a range of higher quality standards. In order to service such requirements, expensive, high performance real-time storage systems are needed. The cost of such systems scales with the bandwidth requirements of the system which in turn increases with the number of client systems that need to be supported. The bandwidth requirements may be especially large in a video editing environment since large media files need to be retrieved in real-time for playback. Currently, when a client replays large parts of a sequence, it fetches the content from a shared media storage server each time the content is played. This can consume available bandwidth, pushing up the server and bandwidth requirements in order to avoid unacceptable latency.

SUMMARY

In general, the methods and systems described herein improve the efficiency of cache systems associated with media editing systems and reduce the need for repeated requests for the same media from shared storage. The cache uses information from the media editing system in order to inform its selection of data to be stored in the cache. Also described are methods and systems for improving the effectiveness of media storage servers that service more than one media editing client.

In general, in one aspect, a data caching method for use with a media composition system serviced by a data caching system includes: determining a state of the media composition system; based on the determined state of the media composition system, generating a priority-ordered list of media data that is anticipated to be requested by the media composition system; in an order of priority specified by the priority-ordered list, requesting media data identified by the priority-ordered list; receiving the requested media data at the data caching system; and writing at least a portion of the received media data into a cache memory of the data caching system.

Various embodiments include one or more of the following features. The media composition system is used to edit a time-based media composition, and the state of the media composition system is based in part on a temporal location of playback of the time-based media composition by the media composition system. Media corresponding to a portion of the media composition within a predetermined time span of the temporal location of playback is given a high priority on the priority-ordered list. Media within the portion of the media composition temporally ahead of the temporal location are given higher priority than media of the portion behind the temporal location. The media composition system is used to edit a time-based media composition, the media composition system represents a current state of the time-based media composition by a displayed timeline, and the state of the media composition system is based at least in part on a sequence of time-based media represented by the timeline. The media composition system is used to edit a time-based media composition, and the state of the media composition system is based at least in part on a set of media objects associated with the media composition. The set of media objects comprises objects stored within at least one of an open bin and an open folder of the media composition system, the open bin or open folder being associated with the time-based media composition. The media composition includes a plurality of thematic components arranged in a temporal sequence, and the set of media objects includes media associated with a thematic component other than a thematic component currently being edited. The thematic component other than the thematic component being edited is stored at a location that is remote from the media editing system. The set of media objects associated with the media composition includes media objects stored within a media asset management system, and the media composition system identifies the media objects stored within the media asset management system by searching for media having metadata indicating a relevance to the media composition system. The set of media objects associated with the media composition includes media objects that are scheduled to be edited on the media composition system at a specified time. The media composition system is used to edit a time-based media composition, and the state of the media composition system is based at least in part on a current editing phase of the time-based media composition. The current editing phase is a preview phase, and generating the priority-ordered list includes selecting low resolution versions of the media data for the list. The current editing phase is a mastering phase, and generating the priority-ordered list includes selecting high resolution versions of the media data for the list. The caching system is a portable system detachably connected to the media composition system. A bandwidth of the portion of received media data that is written into the cache memory is determined dynamically based at least in part on a load on the data caching system when the media data is received by the data caching system. A bandwidth of the portion of received media data that is written into the cache memory is determined dynamically based at least in part on an impact of writing the portion of received media data to the cache memory on a delivery time of currently requested media data to the media composition system.

In general, in another aspect, a data caching method for use with a plurality of media composition systems, wherein the plurality of media composition systems are serviced by a data caching system, includes: determining a state of each of the plurality of media composition systems; based on the determined states of each of the media composition systems, generating a priority-ordered list of media data that is anticipated to be requested by at least one of the media composition systems; in an order of priority specified by the priority-ordered list, requesting media data identified by the priority-ordered list; receiving the requested media data at the data caching system; and writing at least a portion of the received media data into a cache memory of the data caching system.

Various embodiments include one or more of the following features. The priority of an item of media data in the priority-ordered list of media data is based in part on an aggregate likelihood based on the determined states of each of the plurality of media composition systems that at least one of the media composition systems is anticipated to require the item of media data. The priority of an item of media data in the priority-ordered list of media data is based in part on a temporal deadline by which at least one of the media composition systems is anticipated to require the item of media data.

In general, in a further aspect, a data caching method for use with a media composition system for editing a time-based media composition includes: receiving information on usage patterns of media data pertaining to a first media composition by one or more of a first set of users of the media composition system during editing of the first media composition; based on the received information, generating a prioritized list of media data that is anticipated to be required by the media composition system during editing of a second time-based media composition by one or more of a second set of users; in an order of priority specified by the prioritized list, requesting over a network from a media storage system media data identified by the prioritized list; receiving the requested media data at a caching system servicing the media editing system; and writing at least a portion of the received media data into a cache memory of the caching system.

Various embodiments include one or more of the following features. The information on the usage patterns of media data pertaining to the media composition is obtained from results of instrumenting the media composition system during use by the one or more of the first set of users of the media composition system. The first and second media compositions are of a similar type. The first set of one or more users is substantially the same as the second set of one or more users. The first and second media compositions are the same and comprise a plurality of clips, and the information on usage patterns identifies one or more of the plurality of clips that have been played more than once, and wherein the prioritized list includes the one or more clips of the plurality of clips that have been played more than once. The first media composition comprises a plurality of clips and the information on usage patterns indicates repeated use of a first portion of the plurality of clips, each of the first portions including header information for the clip, and wherein the prioritized list includes the first portions of the plurality of clips.

In general, in yet another aspect, a method of servicing a data request from a media composition system serviced by a data caching system, wherein the data request is associated with a specified temporal deadline, includes: receiving the data request at the data caching system; and serving a portion of the data request from the data caching system, wherein a bandwidth of the served portion is based in part on an ability of the media composition system to satisfy the data request by the specified temporal deadline.

Various embodiments include the following feature. A portion of the data request that is not served by the data caching system is served by a remote media storage service.

In general, in an additional aspect, a data caching system for use with a media composition system includes: a cache memory; and a processor programmed to: in an order of priority specified by a priority-ordered list of media that is anticipated to be requested by the media composition system, request over a network from a media storage system media data identified by the priority-ordered list; receive the requested media data; and write at least a portion of the received media data into the cache memory.

Various embodiments include one or more of the following features. The processor is further programmed to: request state information from the media composition system; and generate the priority-ordered list of media that is anticipated to be requested by the media composition system. The priority-ordered list of media that is anticipated to be requested by the media composition system is generated by the media composition system, and the processor is further programmed to receive the priority-ordered list from the media composition system.

DETAILED DESCRIPTION

Figure 1:
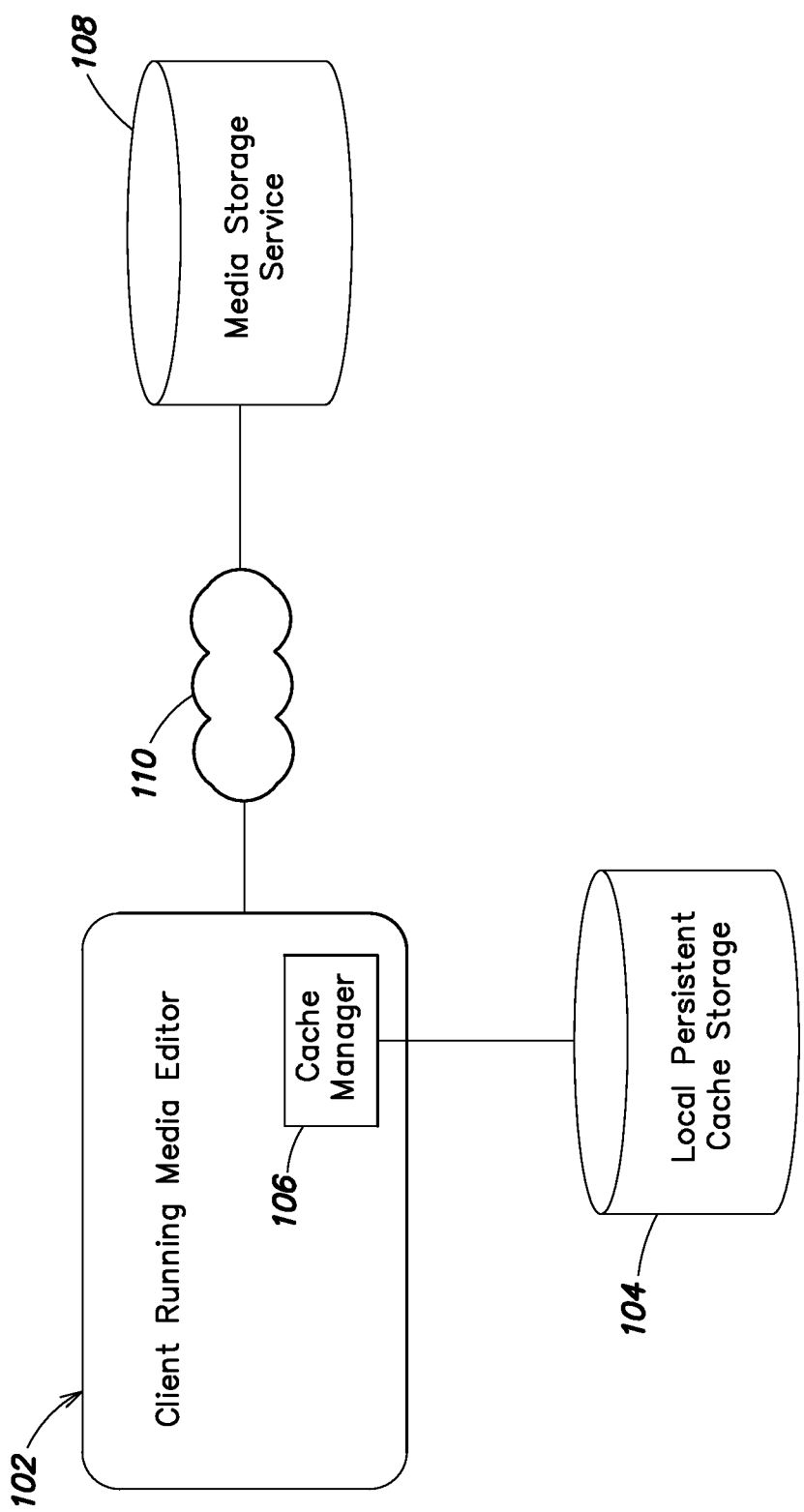
FIG. 1 is a high level block diagram of a media editing system with a cache and shared media storage.

A basic system architecture for a media editing system includes client 102 running a media editing application and local cache storage device 104 connected to the client, and controlled by cache manager 106 running within the client. The client is in data communication with media storage system (MSS, 108) via a data communication network 110. The cache storage may be a solid state drive (SSD), while the MSS may be implemented as a single server, multiple servers, or a hierarchical server array. In such a system, when the client needs some media data, it makes a request to a service that manages the cache, which determines whether to service the request from the cache from the MSS. The MSS is provisioned for high bandwidth in order to meet the real-time playback needs of a large number of clients. Such MSSs include high performance hardware, which makes them costly. In order to reduce the demands on the MSS and the network bandwidth, a cache local to each client stores content that may need to be reused by that client, so that repeated requests for the same data can be satisfied from the cache without the need to request it in real-time from the MSS.

Herein we describe techniques for populating a local cache using appropriate hints from the media editing application and/or from an analysis of prior access patterns. This information is used to decide what is stored in the cache to increase the probability that a client's requests are satisfied from cache instead of from the MSS, thereby reducing overall bandwidth requirements for the MSS. The beneficial effect is further enhanced since intelligent use of the cache is especially effective in reducing real-time requests, and servicing real-time requests is more expensive per unit of bandwidth than non real-time requests. Since media editing applications typically access very large files, the volume of data access usually exceeds the capacity of the local cache. This makes it especially important to select what to store in the cache (and what to evict) intelligently.

In addition, we describe methods for taking the performance of the cache and the MSS into account to make caching and request-serving decisions dynamically.

We now describe an exemplary caching priority order based on information, or hints, from a media composition system, such as a video editing application running on the client, connected to the cache. We first describe rule-based hinting, in which the rules take as an input an aspect of the current state of the video editing application, and/or a workflow manager associated with the editing application, and optionally an associated media asset management (MAM) system.

Non-linear video editing systems include a timeline display, in which a temporal representation of the current state of a composition currently being edited is displayed. The timeline indicates the temporal locations and spans of the various video and audio tracks currently placed in a sequence for the composition. The editing system display also includes a monitor window, in which the sequence can be played back, enabling the editor to view the results of the various editing actions taken. The current temporal location of playback is commonly shown by a "blue line" or scrubber bar superposed on the timeline. A top caching priority are the media data, both audio and video, corresponding to the region of the sequence close to the current playback location, typically represented by the displayed location of the blue bar. The region may extend up to about 60 seconds on either side of the current playback location, but, depending on the size of the available cache and the type of video being edited, the region may be under 60 seconds, e.g., 5, 10, 15, 20, 30, 40, or 50 seconds, or over 60 seconds, e.g., 90, 120, 150, or 180 seconds. The region temporally ahead of the blue bar is given higher priority than the region temporally behind the bar.

A second priority is the media data corresponding to the sequence of clips that is currently placed in the project timeline. A third priority is the media data corresponding to the objects stored in a currently open bin or folder of the video editing system. A fourth priority is the media data associated with the media composition project currently being worked upon. Such media may be stored within one or more folders that are already imported into the media editing system, or may be media that are stored on remote systems, including media asset management systems. A determination that media is associated with the project may be based on metadata that identifies the media as pertaining to a topic, a person, a project name, or other data type that ties the media to the project. The tie can be specific, such as a project name, or can be less specific, such as an association by topic, date, location, producer, or media content description.

When the editing project is a news program, or another kind of program with multiple stories that are organized sequentially in a story line or news run-down, a fifth priority may be the media data associated the next item in the story line or news run-down. Once a story has been completed and sent to its final destination, the newsroom control software informs the cache manager of sequences that are no longer needed and the cache manager may then evict the media files or parts thereof from the cache.

In some situations, editing suites are scheduled in advance for use by various project teams. A sixth priority may be media associated with a project scheduled to be worked on at a particular time, with the immediately following project booked on the schedule having highest priority, and so on moving with lower priority into the future.

During editing, the user may jump to a new location in the timeline for playback. The cached material near the old position is given a lower priority and a new set of media near the new cursor position now becomes a high priority for caching. Similarly, caching is reprioritized when clips are added or removed from the timeline, when a bin or folder is closed and a new one opened, when the user switches from one project to another, or when the editor jumps to a new story in a run-down. The stability of a cache depends on the frequency with which such changes are made. This varies with the type of project being worked on. For example, news program editing tends to have an unstable cache, since new material, such as clips from incoming news feeds, are frequently added to any given story. In such situations, the impact of caching on the hit rate may be limited, and it may be appropriate to lower the temporal scope and subject matter range of caching and prefetching from the media storage server or from other remote sources so as to reserve as much bandwidth as possible for real time data fetching.

By contrast, post production of programs with longer production schedules, such as movies, documentaries, and non-news television programs, tends to be more circumscribed and stable. This means that caching is more likely to have a bigger effect on the cache hit rate, and that aggressive caching may be beneficial. Thus, the type of project being worked upon may be used to affect the degree of speculation and scope of pre-fetching.

Another type of hinting from the media editing application derives from the project type and phase when working in a multi-resolution workflow. For example, when news gathering and previewing in the source monitor, instantaneous playback is required and low-resolution media is used as it suffices for the purpose and enables rapid fetching since the file sizes are relatively small. In this case, the system prioritizes the caching of low resolution proxy media. However, when an object is placed in the timeline, or when media is prepared for screening or mastering, high resolution media is cached.

In various embodiments, the priorities assigned to the various aspects of the video editing system state listed above may be reordered. The optimal order may be adjusted empirically to optimize the cache hit rate, for a given type of editing project and/or editor.

We now describe caching prioritization based on empirically gathered data from behavior patterns of one or more video editor users. Such data is gathered by observation of video editing patterns, or by instrumentation of the video editing application. The empirical data may be user-specific, project-specific, or data aggregated from a user cohort. When data is being gathered by instrumenting the video editing application, the data gathering is invisible to the user, but users may control whether or not to enable such data gathering. When instrumentation is enabled, there may be some impairment of system performance; the system may permit a user to deactivate instrumentation when performing functions for which performance is critical.

In addition to gathering empirical data automatically, the system may also obtain data directly from users, for example via an application setting that enables users to categorize the media currently being used, such as by specifying the various levels in a project hierarchy—clip, project, subject matter, etc. This can yield more accurate data than automatic parsing, especially for higher levels that involve content-related media categorization.

Empirical data gathering requires user data requests and usage to be associated with the application data. In other words, the requested media blocks are identified according to their project, location within a sequence, location relative to the blue bar, and temporal location within a clip.

The following are some examples of the usage patterns that may be gathered empirically: (i) frequent use of the first ten seconds of each clip, including the clip header information; (ii) infrequent use of portions of a clip that are not currently placed in the timeline; (iii) frequent further use of clips within an open bin that have already been played more than once, including clips that are not currently placed in the timeline; (iv) more likely use of additional clips having one or more entries in a descriptive metadata field that are the same as the corresponding metadata entries of clips that have recently been used once or more, the additional clips being within the same bin, project, or located anywhere within a linked MAM system; and (v) after a clip is identified for playback or inclusion within a bin as a result of a media archive search request, the other results returned by the search have an increased likelihood of being used in order of relevance as determined by the search results.

Such empirical data gathering and caching effectively extends the working set of media to a much larger set of media than has been considered in prior systems. A MAM search may be repeated periodically to refresh the working set, and to retrieve any new media data that is added. This aspect is especially pertinent in the news program context in which news is constantly being added.

Empirically guided caching of media data may operate down to a granularity of individual frames of video or audio samples. Other caching schemes may be limited to caching entire files or blocks of data.

Caching priorities may be guided by a combination of rule-based application hinting and empirical caching. In such systems, the caching algorithm is adaptive, with rule-based priority logic being adapted to usage patterns and contexts.

With the increasingly high bandwidths associated with improved quality video, the available bandwidths of the data pathways between the various components of a video editing system and its associated storage devices may be insufficient to service real-time requests on their own. In such situations, system performance may be optimized by means of partial caching, in which only a portion of the accessed content is cached. This contrasts with traditional caching in which a requested file is either cached in its entirety or not at all, or cached based on statically defined criteria. The need for such partial caching arises when the bandwidth of the caching device is lower than the bandwidth of the requested media stream. For example, a 2K uncompressed HD video stream requires a bandwidth of about 300 Mbps. When a client requests such a stream from a media storage server for playback, the local cache may not be able to store data at this rate. With partial caching, a portion of what is received is written to the cache. In the above example, if the cache device has a write bandwidth of 100 Mbps, and no other streams are being played back from the cache, every third block of the file is stored in the cache. During a subsequent playback of the video stream, the client can receive some of the media from the cache, and the rest from the MSS. In addition, further blocks may be written to the cache, though some of the write bandwidth may be consumed for reading blocks from cache out to the client. Even if the entire media file being requested by the client is stored in the cache, the maximum cache read rate may be lower than the media rate required by the client, so the MSS is need to supplement the cache. The decision as to whether to cache a unit of data that makes up a larger whole takes into account the current workload on the cache device and on the MSS, not just a pre-determined guideline. If the load is high, data that would otherwise be cached may not be cached. Caching decisions in traditional file system caches are typically affected by such factors as the size of the request made by the application, or through application hints about whether an entire file should be cached or not. In the described embodiment, parts of an application's request may be cached depending on the load on the cache device.

Referring again to FIG. 1, local persistent cache storage 104 may be a fixed device, and may be integral to client system 102. The cache may be collocated with the client, as shown in the figure, or may be at a remote location, either collocated with the MSS or in some other location. In general, the bandwidth over the data communication channel between the cache and the client is not a bottleneck, and therefore the location of the cache is usually determined by other factors, such as cost and the availability of infrastructure that may be used for cache storage.

Figure 2:
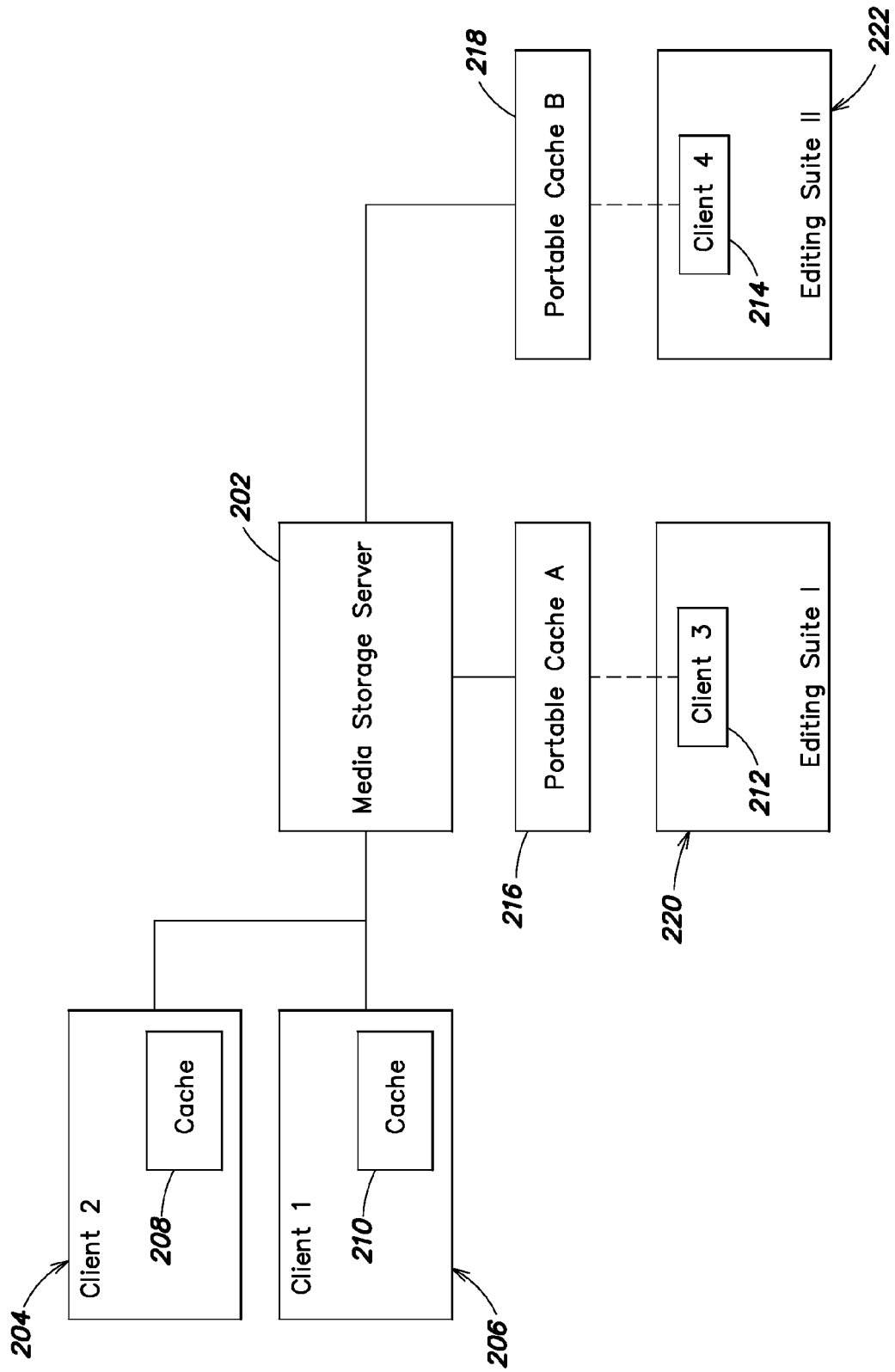
FIG. 2 is a high level block diagram of system having multiple clients served by a single media storage server, including clients serviced by portable caches.

In some embodiments, as illustrated in FIG. 2, the cache is a portable device, which may be associated with an individual user or team of users. In workflows in which a user uses more than one video editing system in the course of a project, the user may carry a personal, portable cache from editing station to another. FIG. 2 shows a system in which shared MSS 202 services requests from one or more clients 204, 206 with fixed caches 208, 210, which may be internal or external to their client, but are collocated with the client. MSS 202 is also able to service one or more clients 212, 214 that are supported by portable caches 216, 218. Each of the portable caches has one or more identifying characteristics, such as a user (or team of users) to whom it is assigned, a project which is being editing using the cache, or a company that owns the cache, such as a post-production company. A portable cache may be implemented as a plug-n-play SSD or hard disk drive, such as a SATA disk. Portable caches have particular value in the post-production media editing context since such work is often performed in extensively equipped editing suites 220, 222 that include, in addition to an editing workstation, equipment such as a console, numerous monitors, studio quality sound systems and sound proofing. Such suites are typically rented by the hour, and are shared among multiple users. When an editor has a time slot scheduled in a suite, it is important to use the time as efficiently as possible, both for cost reasons, and to meet production deadlines. With a portable cache, an editor may plug into the editing workstation and immediately supply much of the required media associated with a project, eliminating most of the set-up time and enabling efficient work to start without the need to request all the required media from a remote MSS. When a portable cache is plugged into a new client machine, the cache manager in that client looks for information about the user for whom the data on the device was cached, and the file system(s) from which data was cached. If the current user of the client host has permission to access the file system that was cached, data from the cache can be used to fulfill user requests.

When requested data is found in the cache, it is checked for validity, i.e., that it has not been modified at the MSS since it was cached. One validation mechanism is to record the last modification time of the file as reported by the MSS. Before using the data one can check with the MSS whether or not the last modified time has changed.

The main purpose of the various techniques discussed here is to improve the performance of one or more media editing clients. A key aspect of performance is the ability to provide media when needed to the video editing application without unacceptable latency. We now describe techniques for meeting latency requirements in an environment in which multiple clients are served by a remote MSS. Assigning a priority to each of the media requests has already been discussed above in connection with the use of application hinting to set pre-fetch caching priorities. We now also consider regular media requests, i.e., requests that are not speculative pre-fetches, by the media editing application. Regular, as well as pre-fetch media requests may be associated with a deadline, which specifies the latest time at which the request may be fulfilled in order to avoid latency. With both priority and deadline information, the system attempts to optimize the use of available bandwidths connecting clients to the MSS, and cache read/write rates.

When a media request from a client is associated with a deadline, the cache manager determines whether the requested data is in the cache. However, the cache manager services the new request only if servicing it in a timely manner would not cause previously accepted requests to miss their deadlines. Rejected requests are forwarded to the MSS. Furthermore, when data is received by the cache manager, it writes it to the cache device only if doing so would not cause requests to miss their deadlines. If the deadlines of a request cannot be met by the cache, some or all of the requested data may need to be supplied by the MSS, even if the requested data currently resides in the cache. For example, when an application requests a 1.2 GBps media stream but the cache read rate is only 400 MBps, the cache manager may supply ⅓ of the requested data from the cache, and ⅔ from the MSS.

Speculative pre-fetching of media is greatly facilitated in systems having an MSS that is capable of processing requests according to their priority level. An example of such an MSS may be implemented using an ISIS® system available from Avid Technology, Inc., Burlington, Mass., described in part by U.S. Pat. Nos. 7,660,947, 7,844,775, and 7,917,696, which are hereby incorporated herein by reference. MSSs that do not accept a priority level associated with a request do not make a distinction between pre-fetch requests and other requests. In such systems, the amount of pre-fetching needs to be limited in order not to degrade the performance of the system in supplying media associated with regular requests, such as those generated by playback. In comparison to priority-blind MSSs, an MSS with priority sensitivity is able to populate a cache more effectively by using available bandwidth for pre-fetching in the absence of high priority requests without risking degrading performance when high priority requests are received. In practice, this allows a priority-sensitive MSS to service more clients than a corresponding priority-blind MSS.

An application may issue a request for data that the cache manager may already be trying to pre-fetch, i.e., a lower priority request might have been made to the MSS but the data has not yet been supplied. In such a situation the MSS supports priority escalation of an existing request so that the data can be accessed at the application's priority instead of the pre-fetch priority.

In addition to being priority aware, an MSS may also be deadline aware. Such an MSS enables applications to specify a deadline for each request, and the MSS attempts to meet the deadlines of accepted requests. As described earlier, deadline awareness may also be incorporated in the cache device. If the cache manager has made requests to pre-fetch data and, prior to receiving the requested data, the state of the media editing application changes so as render the pre-fetch request obsolete, the cache manager has the ability to cancel the request.

In addition to the prefetch priorities derived from the state of the media editing application discussed above, we now describe some factors that affect media request priorities, whether the request is a speculative cache pre-fetch or a regular request from the media editing application.

A request priority may depend on the type of user making the request. For example, a craft editor needing 100% fidelity, with all deadlines met is given a higher priority than a browse editor who is able to tolerate a certain number of glitches during media review. In general, a regular media request from the editing application has high priority and a cache manager pre-fetch request has low priority. The priority may also be affected by the type of activity that generated the request. For example, a request generated by playback has high priority, while a request generated by a file copy operation has low priority.

Deadlines are set by both the application and by the cache manager. For regular requests, the application knows when it requires media for playback based on the relative positions of the current playback location and the media to be retrieved. Legacy applications may not specify a priority or a deadline. In such situations the cache manager heuristically assigns priorities based on any knowledge it has about the origin of a request and/or user settings. For example, if the user indicates that a high bandwidth project is being worked on then a shorter deadline would be used. For prefetching, the deadlines may be based on when the data would likely be needed if it were in fact used, or alternatively they can be given an arbitrarily delayed due time if there is no specific time when the data will be needed.

We now describe how the priorities and deadlines associated with media requests are handled by clients, cache managers, and the MSS. Clients issue regular (as opposed to pre-fetch) requests having assigned priorities and deadlines as discussed above. If the cache manager is able to service the request, it does so and the request is not forwarded on to the MSS. If the cache manager is not able to service the request, either because it does not have the data, or because it cannot meet the deadline, it passes the request together with its associated priority and deadline to the MSS. The MSS receives a stream of requests from the one or more cache managers that service the one or more clients it supports. Each request includes the assigned priority and deadline. The MSS adds the request to its queue, taking into account the priority and deadline.

An example of a mechanism for passing media editing application hints to the cache manager is described next. In a media editing application a user works with several tracks of audio and video in a timeline. Each video track consists of a concatenation of frames stored in files. An application can specify the content accessed by a file as an ordered list of <filename, extent, relativeTime> tuples called TrackAccess. In turn, an extent is a <start offset, end offset> tuple. An application passes the TrackAccess list for each track to the cache manager. Users typically access content in a particular part of the track, such as the current playback location, and in the forward or reverse direction from that location. The cache manager guesses a user's area of interest, the direction and the rate of requests from the requests made by the application and its knowledge of the TrackAccess list. It is also able to start guessing the subsequent accesses from the TrackAccess list and to issue pre-fetches for the data in those accesses. If a user changes the area of interest, such as by jumping to a different playback location, the cache manager recognizes that requests are now in a different part of the TrackAccess list. It then cancels previously issued pre-fetches and issues new pre-fetches for the new area of interest. If a user inserts new content into the timeline, the application updates the TrackAccessList accordingly.

The cache manager may also use knowledge of the type of media files in its caching decisions. For example audio files may be given higher priority than video files because they typically consume less space than video files, and reducing audio accesses to the MSS allows certain bandwidth optimizations to be made at the MSS. For example, the MSS may be able to use larger disk blocks if it has to support fewer requests for smaller audio data.

Each media file used in editing applications has metadata at the beginning of a file that is used to determine offsets within the file for the frames that make up the video data and to decode content for display. When a cache manager is given the TrackAccess list it can start prefetching the beginning of each file.

The idea of application hinting and partial caching may also be extended to an MSS that has its own cache to accelerate serving of data to clients. Clients provide the same hints that they provide to the private cache described above. The MSS uses aggregate information from the all the hints it receives to cache data that is likely to be frequently accessed. For example, if it has the TrackAccess information from all files, it can order files and extents by how frequently they appear in the TrackAccess. Files and extents that appear with higher frequency in the TrackAccess list are given higher priority for caching.

The various components of the system described herein may be implemented as a computer program using a general-purpose computer system. Such a computer system typically includes a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touch screen, communication device, and data input devices. The invention is not limited to the particular input or output devices used in combination with the computer system or to those described herein.

The computer system may be a general purpose computer system which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid state drives, which may include an array of local or network attached servers.

A system such as described herein may be implemented in software or hardware or firmware, or a combination of the three. The various elements of the system, either individually or in combination may be implemented as one or more computer program products in which computer program instructions are stored on a non-transitory computer readable medium for execution by a computer, or transferred to a computer system via a connected local area or wide area network. Various steps of a process may be performed by a computer executing such computer program instructions. The computer system may be a multiprocessor computer system or may include multiple computers connected over a computer network. The components described herein may be separate modules of a computer program, or may be separate computer programs, which may be operable on separate computers. The data produced by these components may be stored in a memory system or transmitted between computer systems.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A data caching method for use with a media access application serviced by a data caching system, the method comprising:
    the media access application requesting a stream of media data, wherein a bandwidth of the requested stream of data exceeds an available bandwidth of the data caching system;
    the media access application receiving the stream of media data;
    writing a portion of the received media data stream into a cache storage of the data caching system, wherein a bandwidth of the portion of received media data that is written into the cache storage is determined in real time based at least in part on a bandwidth of the data caching system that is currently available for writing to the cache when the media data is received by the media access application, such that a change in the bandwidth of the data caching system available for writing to the cache results in a change of the bandwidth of the portion of received media data that is written into the cache storage; and
    wherein playback of the stream of media data by the media access application subsequent to the above-mentioned requesting step includes the media access application receiving a first portion of the media data required for playback from the data caching system and receiving a second portion of the media data required for playback from a media storage system running on a host external to a system running the media access application.

2. The method of claim 1, further comprising:
    after the first-mentioned requesting and writing steps, the media access application again requesting the stream of media data; and
    writing a second portion of the received media data stream into the cache storage of the data caching system, a bandwidth of the second portion being based at least in part on a load on the data caching system when the media data stream is received by the data caching system for a second time.

3. The method of claim 1, wherein the stream of media data is played back by the media access application, and wherein a cached portion of the media data required for playback is received from the data caching system and a remainder of the media data required for playback is received from a remote media storage system.

4. The method of claim 3, wherein a bandwidth of the cached portion is limited by a media reading bandwidth available from the data caching system such that the remainder of the media data required for playback includes media data that is present on the data caching system but which the data caching system is not able to supply before it is needed by the media access application.

5. The method of claim 1, wherein the bandwidth of the requested stream is between 300 megabits per second and 1.5 gigabits per second.

6. The method of claim 5, wherein the bandwidth of the portion of the received media data that is written into the cache storage is between 50 and 150 megabits per second.

7. The method of claim 1, wherein the data caching system is an integral component of the media access application.

8. The method of claim 1, wherein the data caching system is a portable device detachably connected to a host computer on which the media access application runs.

9. The method of claim 8, wherein the data caching system is associated with one or more individual users of the media access application.

10. The method of claim 1, wherein at least one of a priority and a deadline is specified when the media access application requests the stream of media data.

11. The method of claim 10, wherein the at least one of a priority and a deadline is determined in part by a type of activity that generated the request for the stream of media data.

12. The method of claim 1, wherein the request for the media stream by the media access application is given a high priority when the media stream is required for playback.

13. The method of claim 1, wherein the request for the media stream by the media access application is given a low priority when the media stream is required for a file copy operation.

14. A data caching method for use with a media access application serviced by a data caching system, the method comprising:
the media access application requesting a stream of media data, wherein a bandwidth of the requested stream of data exceeds an available bandwidth of the data caching system;
the media access application receiving the stream of media data;
writing a portion of the received media data stream into a cache storage of the data caching system, wherein a bandwidth of the portion of received media data that is written into the cache storage is determined in real time based at least in part on an impact of writing the portion of received media data to the cache storage on an expected delivery time of media data that has been requested by the media access application, such that a change in the impact of writing the portion of received media data to the cache storage on an expected delivery time of media data that has been requested by the media access application results in a change of the bandwidth of the portion of received media data that is written into the cache storage; and
wherein playback of the stream of media data by the media access application subsequent to the above-mentioned requesting step includes the media access application receiving a first portion of the media data required for playback from the data caching system and receiving a second portion of the media data required for playback from a media storage system running on a host external to a system running the media access application.

15. The method of claim 14, further comprising:
after the first-mentioned requesting and writing steps, the media access application again requesting the stream of media data; and
writing a second portion of the received media data stream into the cache storage of the data caching system, a bandwidth of the second portion being based at least in part on an impact of writing the second portion of received media data to the cache storage on an expected delivery time of media data that has been requested by the media access application.

16. The method of claim 14, wherein the stream of media data is played back by the media access application, and wherein a cached portion of the media data required for access is received from the data caching system and a remainder of the media data required for access is received from a remote media storage system.

17. The method of claim 14, wherein a bandwidth of the cached portion is limited by a media reading bandwidth available from the data caching system such that the remainder of the media data required for playback includes media data that is stored in the data caching system but which the data caching system is not able to supply before it is needed by the media access application.

18. The method of claim 14, wherein the request for a stream of media data includes a deadline for meeting the request and wherein the portion of the received media data that is written into the cache storage is managed so as to satisfy the deadline.

19. The method of claim 14, wherein the request for a stream of media data includes a deadline for meeting the request, and wherein during playback of the stream of media data on the media access application, a bandwidth of a portion of the media data required for playback received from the data caching system is adjusted so as to satisfy the deadline.

20. A method of playing back a stream of media data on a media access application, the method comprising:
the media access application requesting a stream of media data, the request including a deadline for receipt of the data and wherein a bandwidth of the requested stream of data exceeds the available bandwidth of the data caching system;
receiving a first portion of the media data required for playing back the stream from a data caching system; and
receiving a second portion of the media data required for playing back the stream from a media storage system running on a host external to a system running the media access application;
using available bandwidth of the data caching system to write a third portion of the media data received from the media storage system into a cache storage of the data caching system; and
wherein during playback, a bandwidth of the first portion, second portion, and third portion are adjusted in response to a real-time load on the data caching system such that the deadline for receiving the data is satisfied, and wherein a change in the real-time load on the data caching system results in a change in at least one of the bandwidths of the first portion, second portion, and third portion.

* * * * *